(12) United States Patent
Berson

(10) Patent No.: US 6,251,167 B1
(45) Date of Patent: Jun. 26, 2001

(54) MACHINE AND PROCESS FOR REMOVING DISSOLVED GASSES FROM LIQUIDS

(75) Inventor: William Berson, Weston, CT (US)

(73) Assignee: Berson Research Corp., Weston, CT (US)

(*) Notice: Subject to any disclaimer, the term of this patent is extended or adjusted under 35 U.S.C. 154(b) by 0 days.

(21) Appl. No.: 09/561,438

(22) Filed: Apr. 28, 2000

Related U.S. Application Data

(60) Provisional application No. 60/160,456, filed on Oct. 21, 1999.

(51) Int. Cl.⁷ .................................................. B01D 19/00
(52) U.S. Cl. ................................... 95/263; 95/12; 95/24; 96/157; 96/165; 96/172; 96/206; 210/188
(58) Field of Search ................................ 95/263, 24, 12, 95/19; 96/157, 165, 172, 203, 206, 220; 55/467; 210/188

(56) References Cited

U.S. PATENT DOCUMENTS

| | | | |
|---|---|---|---|
| 3,151,064 | * 9/1964 | Lathrop | ..................... 95/263 |
| 3,784,008 | 1/1974 | Troglione . | |
| 4,412,924 | * 11/1983 | Feather | ..................... 95/263 |
| 4,508,545 | 4/1985 | DeLoach . | |
| 4,526,692 | 7/1985 | Yohe et al. . | |
| 4,582,610 | 4/1986 | Baker . | |
| 4,608,163 | 8/1986 | Yohe et al. . | |
| 4,659,463 | * 4/1987 | Chandler et al. | ..................... 210/202 |
| 4,756,724 | * 7/1988 | Yuill | ..................... 96/158 |
| 4,798,034 | 1/1989 | Jarnagin et al. . | |
| 4,843,786 | 7/1989 | Walkinshaw et al. . | |
| 4,869,832 | 9/1989 | Lamarre . | |
| 4,927,433 | * 5/1990 | Wieland et al. | ..................... 95/12 |
| 4,957,394 | 9/1990 | Jarnagin et al. . | |
| 4,988,237 | 1/1991 | Crawshaw . | |
| 5,003,750 | 4/1991 | Delgado . | |
| 5,045,215 | * 9/1991 | Lamarre | ..................... 95/263 |
| 5,100,555 | * 3/1992 | Matson | ..................... 95/44 |
| 5,104,554 | 4/1992 | Dempsey . | |
| 5,107,642 | 4/1992 | Mogstad . | |
| 5,143,606 | 9/1992 | Bernhardt . | |
| 5,147,530 | * 9/1992 | Chandler et al. | ..................... 210/90 |
| 5,149,343 | 9/1992 | Sowinski . | |
| 5,194,158 | 3/1993 | Matson . | |
| 5,279,746 | 1/1994 | Ziol . | |
| 5,354,459 | * 10/1994 | Smith | ..................... 210/188 |
| 5,376,273 | * 12/1994 | Pacheco et al. | ..................... 210/490 |
| 5,403,234 | 4/1995 | Kuypers . | |
| 5,660,721 | * 8/1997 | Kyriss et al. | ..................... 210/188 |
| 5,766,321 | * 6/1998 | Ishihara et al. | ..................... 95/263 |

* cited by examiner

Primary Examiner—Duane Smith
Assistant Examiner—Jason M. Greene
(74) Attorney, Agent, or Firm—John V. Stewart

(57) ABSTRACT

An enclosed tank with a liquid inlet, a liquid outlet, a gas inlet, and a gas outlet. A liquid is forced to flow turbulently through the tank. Simultaneously a scrubbing gas is pumped through the tank. Turbulence induced in the liquid encourages gasses dissolved in the liquid to transfer to the scrubbing gas and thence to exit the gas outlet. Liquid pressure is provided externally to the invention, such as by a water utility or house water pump. The liquid inlet has a nozzle that injects the liquid against baffles in the tank to create turbulence. The liquid level in the tank is stabilized by controlling the scrubbing gas pressure. A lower layer of liquid and an upper layer of scrubbing gas are maintained in the tank as they flow through the tank together. Various liquid level stabilizing means are shown as examples. An electronic feedback system optionally controls the scrubbing gas flow rate according to the contamination level of the liquid.

8 Claims, 4 Drawing Sheets

MACHINE AND PROCESS FOR REMOVING DISSOLVED GASSES FROM LIQUIDS

CROSS-REFERENCE TO RELATED APPLICATIONS

This application claims the benefit of U.S. Provisional Application No. 60/160,456 filed Oct. 21, 1999.

BACKGROUND OF THE INVENTION

1. Field of the Invention

This invention relates generally to the field of water treatment, and more particularly to a machine and method for removing dissolved gases from liquids.

2. Description of Prior Art

Liquids such as potable water supplies may contain unwanted dissolved gases such as radon and hydrogen sulfide. There is a need to remove these gases to improve the quality, esthetics and potability of water with a minimum of expense and plumbing without the creation of contaminated filtering media needing future disposal. Similar problems exist in various industrial processes where dissolved gases must be removed from liquids.

The prior art for removal of dissolved gases includes aeration and filtering. Aeration has been achieved by injection of a stream of air or other gas into the liquid, either by mechanical agitation of the liquid or by spraying the liquid into itself. Aeration requires a vessel with means to increase the effective liquid/gas surface area and subsequent transport of the dissolved gas out of the liquid. Filtering uses media such as activated charcoal, which adsorbs the unwanted contaminants by virtue of its large effective surface area and structure.

Examples of the prior art are found in the following U.S. patents:

U.S. Pat. No. 5,660,721 Apparatus For Treatment Of Well Water Provided Through A Well Water Supply Line
U.S. Pat. No. 3,784,008 Ozonating Apparatus For Drinking Water
U.S. Pat. No. 4,508,545 Closed Loop Water Treating System And Method
U.S. Pat. No. 4,526,692 Process For Purification Of Contaminated Groundwater
U.S. Pat. No. 4,582,610 Well Water Aeration System
U.S. Pat. No. 4,608,163 Apparatus For Purification Of Contaminated Groundwater
U.S. Pat. No. 4,659,463 System To Remove Contaminants From Water
U.S. Pat. No. 4,756,724 Extracting Radon Gases From A Domestic Water Supply
U.S. Pat. No. 4,798,034 Method And Apparatus For Collecting And Discharging Radon Gas And Fluids
U.S. Pat. No. 4,843,786 Enclosure Conditioned Housing System
U.S. Pat. No. 4,869,832 Radon Removal Method
U.S. Pat. No. 4,957,394 Method And Apparatus For Sub-Floor Collection And Disposal Of Radon Gas
U.S. Pat. No. 4,988,237 Soil Gas Reduction System
U.S. Pat. No. 5,003,750 Method For Reducing Immunogenic And/Or Toxic Substances In Indoor Air
U.S. Pat. No. 5,045,215 Removing Hazardous Contaminants From Water
U.S. Pat. No. 5,100,555 Method And System For Removing Radon From Radon Containing Water
U.S. Pat. No. 5,104,554 Removing Radon By Downhole Sparging Of Air
U.S. Pat. No. 5,107,642 Arrangement In Screening Of Objects, Especially Residential Houses
U.S. Pat. No. 5,143,606 Arrangement For Cleaning Contaminated Ground Water
U.S. Pat. No. 5,147,530 Well Water Removal And Treatment System
U.S. Pat. No. 5,149,343 Method For Filtering Radon From A Gas Stream
U.S. Pat. No. 5,194,158 Radon Removal System And Process
U.S. Pat. No. 5,279,746 Process And Apparatus For Removing Radon From Water
U.S. Pat. No. 5,354,459 Apparatus And Method For Removing Odorous Sulfur Compounds From Potable Water
U.S. Pat. No. 5,403,234 Radon Gas Evaluation System And Method.

Shortcomings of the prior art are its complexity, size, and cost. Aeration as described in the above citations requires secondary pumps scaled to the main supply pump, large reaction vessels and elaborate piping. In addition, these systems do not contain provision for control of the degassing process by sensing the exhaust contamination level.

Approaches using activated charcoal or other filtering media suffer from the limited capacity of the filtering media, the need to recharge or replace it and the attendant cost. Recharging of filtering media contaminated with gaseous contaminants generally requires removal of the media to a recycling facility and the use of chemical cleaners or elevated temperatures, all of which are difficult or impossible to employ on-site.

SUMMARY OF THE INVENTION

The primary object of the invention is removal of radon and other dissolved gases from water or other liquids without a large aeration tank. Another object of the invention is removal of radon or other dissolved gases from liquids without a secondary liquid pump. A further object of the invention is removal of radon or other dissolved gases from liquids with an in-line on-demand device. Yet another object of the invention is removal of radon or other dissolved gases from liquids without a disposable liquid filtering medium. Another object is provision of a small, inexpensive radon removal mechanism for residential water that can be implemented in models for a whole house, under the sink, and countertop.

These objectives are achieved in a device with an enclosed tank having a liquid inlet, a liquid outlet, a gas inlet, and a gas outlet. A liquid to be cleaned is forced to flow turbulently through the tank from the liquid inlet to the liquid outlet. Simultaneously a scrubbing gas is pumped through the tank from the gas inlet to the gas outlet. Turbulence induced in the liquid encourages gasses dissolved in the liquid to transfer to the scrubbing gas and thence to exit the gas outlet. The liquid has inlet pressure provided externally to the invention, such as water pressure provided by a water utility or house water pump. The liquid inlet has a nozzle that injects the liquid against baffles in the tank to create turbulence. The liquid level in the tank is stabilized by controlling the scrubbing gas pressure, so that both a lower layer of liquid and an upper layer of scrubbing gas are maintained at all times in the tank as they flow through the tank together. A model of this device small enough for kitchen countertop installation was found highly effective in removing radon gas from tap water. Various liquid level stabilizing means are shown as examples herein. An example is shown that additionally controls the scrubbing gas flow rate according to the contamination level of the liquid.

REFERENCE CHARACTERS

Figure 1:
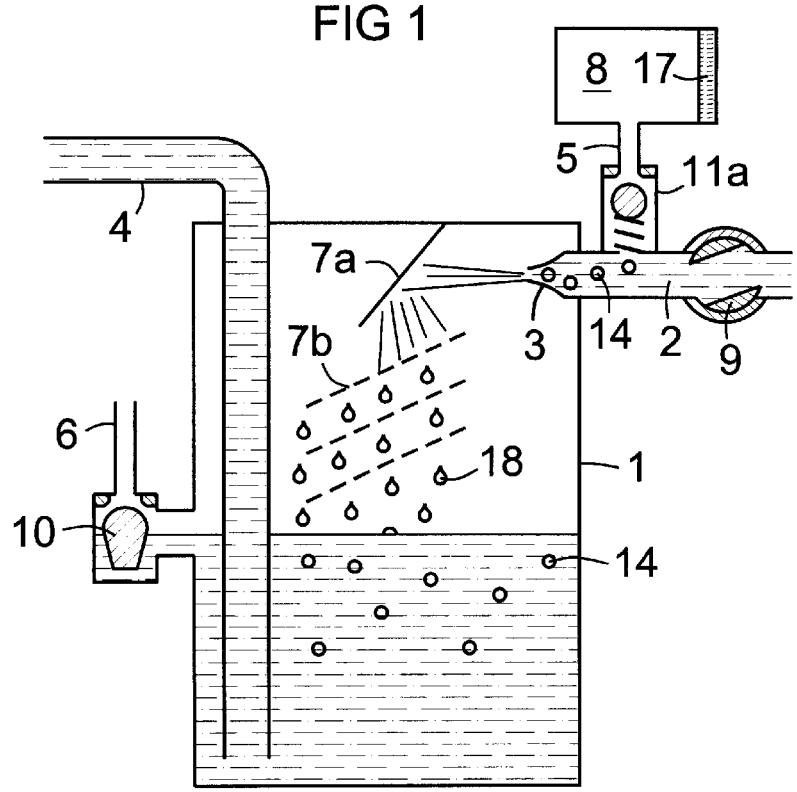
FIG. 1 is a schematic view of an example of the invention with a continuous flow of scrubbing gas, stabilization of the liquid level by a float valve on the scrubbing gas outlet, and a demand valve on the liquid inlet.

1. Tank
2. Liquid inlet
3. Liquid inlet nozzle
4. Liquid outlet
5. Scrubbing gas inlet
6. Scrubbing gas outlet
7a. First baffle
7b. Percolation baffle or baffles
7c. Bubble separation baffle
8. Scrubbing gas pump
9. Liquid flow rate and shut-off valve (demand valve)
10. Float valve
11a. Scrubbing gas check valve
11b. Liquid inlet check valve
12. Electronic controller, such as a microprocessor
13. Scrubbing gas pressure relief valve
13a. Scrubbing gas pressure relief valve
PW Liquid pressure signal
PA Scrubbing gas pressure signal
CA Gas pump control signal
VA Gas vent valve control signal
LW Liquid level signal
CO Liquid contamination signal
14. Scrubbing gas bubbles
15. Gas permeable membrane
16. Membrane support frame
17. Air Filter
18. Liquid drops
19. Liquid level sensor
20. Liquid contamination sensor
21. Liquid pressure sensor
22. Scrubbing gas pressure sensor
23. Scrubbing gas vent valve

DETAILED DESCRIPTION

FIG. 1 shows an example of the invention having a tank 1 with a liquid inlet 2, a liquid outlet 4, a scrubbing gas inlet 5, and a scrubbing gas outlet 6. A liquid to be cleared of dissolved gas enters the tank through an inlet nozzle 3 under pressure provided externally to the invention. The inlet nozzle sprays the liquid against a first baffle 7a, which redirects and splatters the liquid onto one or more additional baffles 7b. Preferably the first baffle 7a is solid, and the additional baffles 7b are perforated and/or corrugated and/or dimpled to maximize their surface area, causing the liquid to percolate with maximum surface and time exposure to the scrubbing gas. The flow of liquid is controlled by a demand valve 9 on the liquid inlet. This valve can be of any conventional type.

A scrubbing gas, such as air, is continuously pumped through the tank. Sufficient scrubbing capacity to remove radon gas from residential drinking water can be achieved with an inexpensive aeration pump like those used in home aquariums. This pump must produce a higher maximum gas pressure than the pressure of the liquid at the liquid inlet.

The level of liquid in the tank is maintained by the pressure of the scrubbing gas via a float valve 10 on the scrubbing gas outlet 6. When a user opens the demand valve 9, liquid flows into the tank, raising the liquid level in the tank, and causing the float valve to rise, which closes the scrubbing gas outlet. Since the scrubbing gas is continuously pumped into the tank, and has a higher pressure than the liquid, closing the gas outlet causes increased gas pressure in the tank, which forces the liquid level down by forcing liquid to exit the liquid outlet 5. When the liquid surface is lowered to a given level, the float valve opens the gas outlet. The continuously variable reaction of the float valve keeps the liquid level stable in the tank, and keeps the pressure of the scrubbing gas in equilibrium with the pressure of the liquid.

The device of FIG. 1 was tested, and it demonstrated high effectiveness at removing dissolved radon gas from tap water, including total effectiveness for intermittent use. The inventor built a prototype, collected water samples under a variety of operational conditions, and sent them to an independent laboratory for testing. The tested water flow rate of 19 Liters per minute is equivalent to 5 U.S. gallons per minute.

| TEST NO. | TESTED CONDITION L/minute | RADON LEVEL pC/L | RADON REDUCTION PERCENT |
|---|---|---|---|
| 1 | Raw water sample #1 | 607 | 0 |
| 2 | Water flow = 19 Air flow = 0 | 617 | 0 |
| 3 | Water flow = 19 Air flow = 14 | 219 | 64 |
| 4 | Water flow = 19 Air flow = 28 | 5 | 99 |
| 5 | Water flow intermittent Air flow = 28 | 0.0 | 100 |
| 6 | Raw water sample #2 | 591 | 0 |

When the device is used to remove radon from tap water, the air outlet 6 should be ducted to the outside air. A check valve 11a prevents backflow of liquid into the air pump if the air pump stops for any reason. The device of FIG. 1 is appropriate for kitchen countertop use in which a single demand valve operates the unit.

Figure 2:
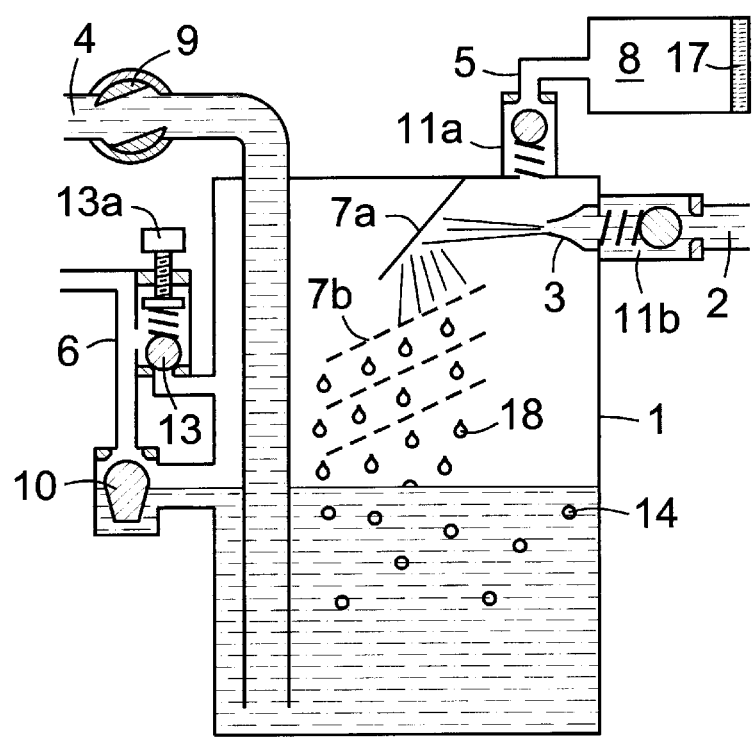
FIG. 2 is a schematic view of a version similar to FIG. 1, except that the demand valve is on the liquid outlet, and that a liquid inlet check valve 11b and a scrubbing gas pressure relief valve 13 are provided.

FIG. 2 shows the device of FIG. 1 with the demand valve on the outlet instead of the inlet. This embodiment can have multiple demand valves, and can thus be installed as a whole-house unit. In this embodiment, it is possible that after the demand valve is closed the liquid temperature may rise enough to expand the liquid and partially or fully close the float valve. This would slow or stop the gas circulation, and could cause the gas pressure to increase enough to force gas into the liquid inlet. To prevent this, a check valve 11b is provided on the liquid inlet and a gas pressure relief valve 13 is provided on the upper part of the tank. When the gas pressure exceeds the liquid inlet pressure, the liquid check valve 11b closes, preventing backflow of gas into the liquid inlet. At a given gas pressure above the liquid inlet pressure, the gas pressure relief valve opens, allowing the gas to continue to circulate, providing scrubbing. The relief valve can have a fixed set-point that is higher than the known liquid inlet pressure. However, preferably the relief valve set-point is adjustable as shown, so it can be set according to the inlet pressure of the liquid. Alternately, the relief valve can have an automatic set-point operated by a diaphragm and linkage influenced by liquid pressure communicated hydraulically from the liquid inlet.

Figure 3:
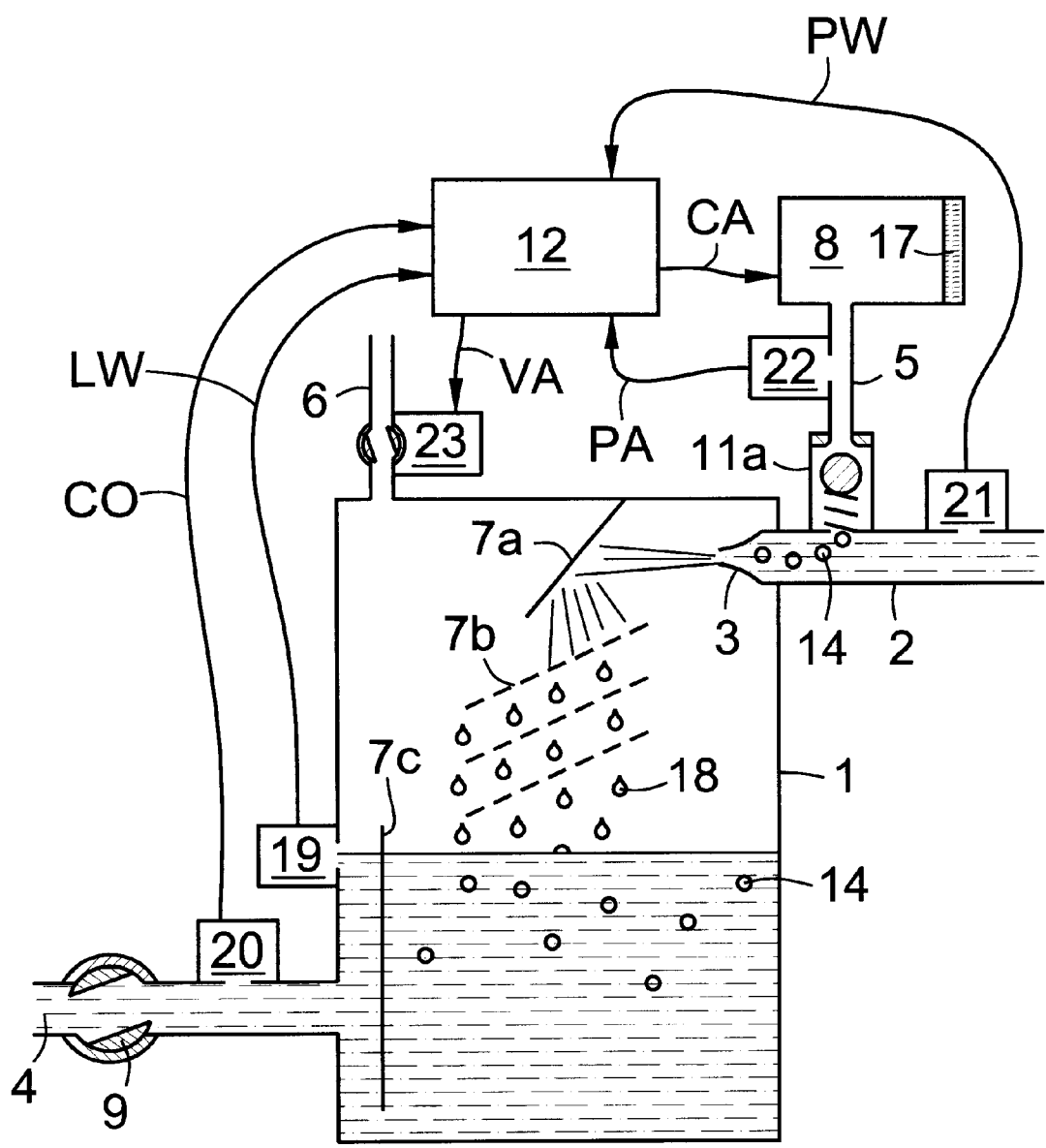
FIG. 3 is a schematic view of the invention using electronic feedback and stabilization of the liquid level, checking of the liquid outlet contamination level, and control of the flow rate of the scrubbing gas.

The embodiment of FIG. 3 uses the same basic process as FIGS. 1 and 2 for removing dissolved gasses from liquids, but has an electronic feedback and control system. An electronic controller 12, such as a microprocessor, has electronic input and output signal lines, executes logic that produces results based on signal input, and generates output signals as known in the art. Input is provided by a liquid pressure sensor 21, a scrubbing gas pressure sensor 22, a liquid level sensor 19, and optionally a liquid outlet contamination sensor 20. A control signal CA is output to the scrubbing gas pump 8, and a control signal VA is output to a scrubbing gas vent valve 23. This control system provides stabilization of the liquid level in the tank, equalizes the pressure of the scrubbing gas with the liquid, and varies the flow rate of the scrubbing gas according to the contamination level of the liquid.

Figure 6:
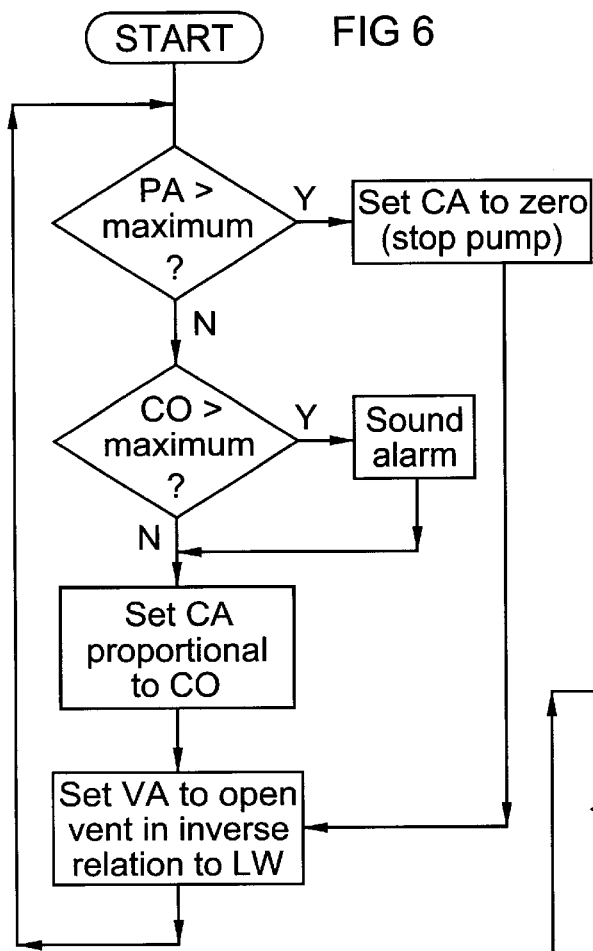
FIG. 6 is a flowchart of a control algorithm for the embodiment of FIG. 3.

A flowchart for a suitable control algorithm for the device of FIG. 3 is shown as FIG. 6. CA is a control signal output to the scrubbing gas pump 8 according to the algorithm. The algorithm sets CA to in proportion to the contamination level CO detected at the liquid outlet sensor 20. As the contamination level increases, the scrubbing gas flow is increased. VA is the control signal output to the scrubbing gas vent valve 23. It opens the valve in inverse proportion to a liquid level signal LW. If the liquid is below the desired level, gas venting is increased, reducing the pressure of the scrubbing gas in the tank, thus allowing the liquid to rise in the tank to the desired level.

Vent valve 8 closes completely by default when power is lost. This prevents liquid from flowing out of the gas vent 6 in the absence of pressure of the scrubbing gas. A check valve 11a on the scrubbing gas inlet prevents liquid backflow into the gas pump in case it fails for any reason, including power failure.

Figure 4:
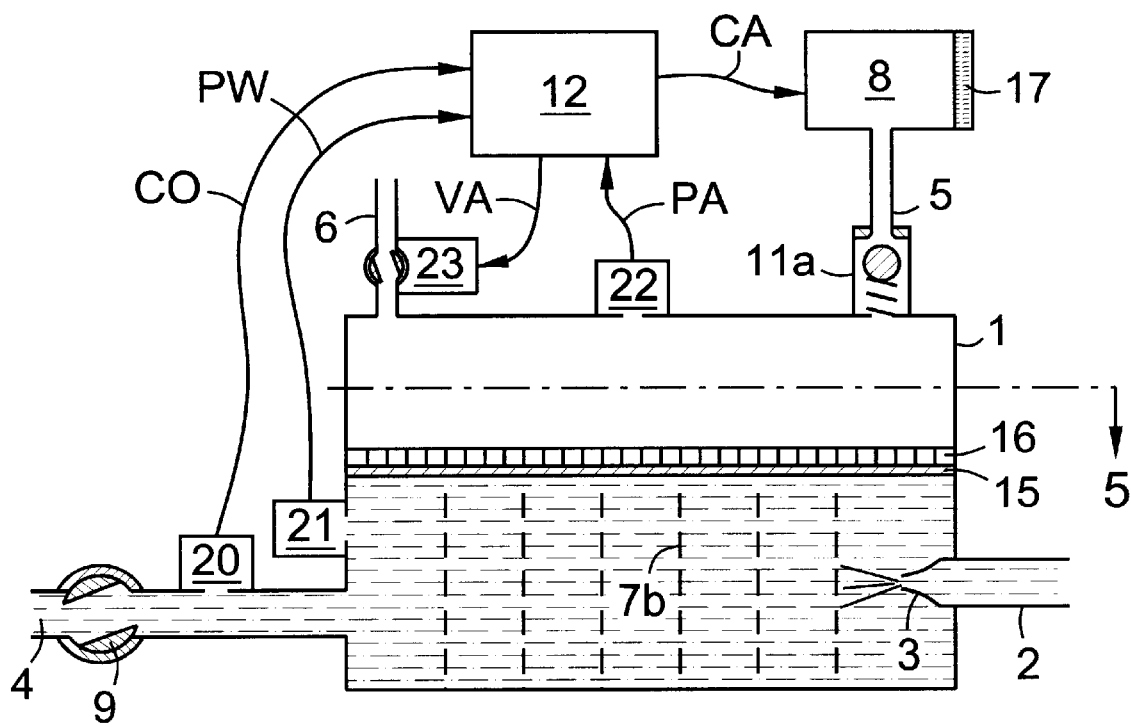
FIG. 4 is a schematic view of a fourth embodiment, with a gas-permeable membrane 15.
Figure 5:
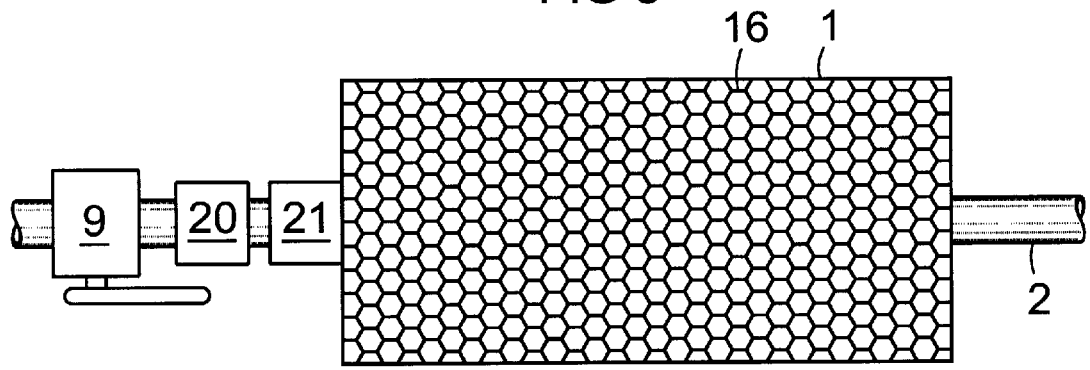
FIG. 5 is a view of FIG. 4 taken along line 5.

FIGS. 4 and 5 show an embodiment that controls the liquid level partly by electronic control of pressure of the scrubbing gas, and partly by a membrane 15 that acts as a lid on the liquid. The membrane is gas permeable, and allows the dissolved gasses to pass through it into the scrubbing gas. The liquid inlet nozzle 3 enters the tank below the surface of the liquid, and sprays the liquid against perforated submerged baffles 7b to induce turbulence. A frame 16 forms a grid over the membrane, and supports it against upward pressure from the liquid. The scrubbing gas is controlled to have slightly less pressure in the tank than the liquid in the tank, making the membrane the upper limit of the liquid level. The liquid and scrubbing gas pressures in the tank are provided to the controller 12 by sensors PW and PA respectively. The controller operates the vent valve VA to control the scrubbing gas pressure in the tank. If a contamination sensor CO is provided as shown, the controller sets the pump rate of the scrubbing gas according to the contamination level detected.

Figure 7:
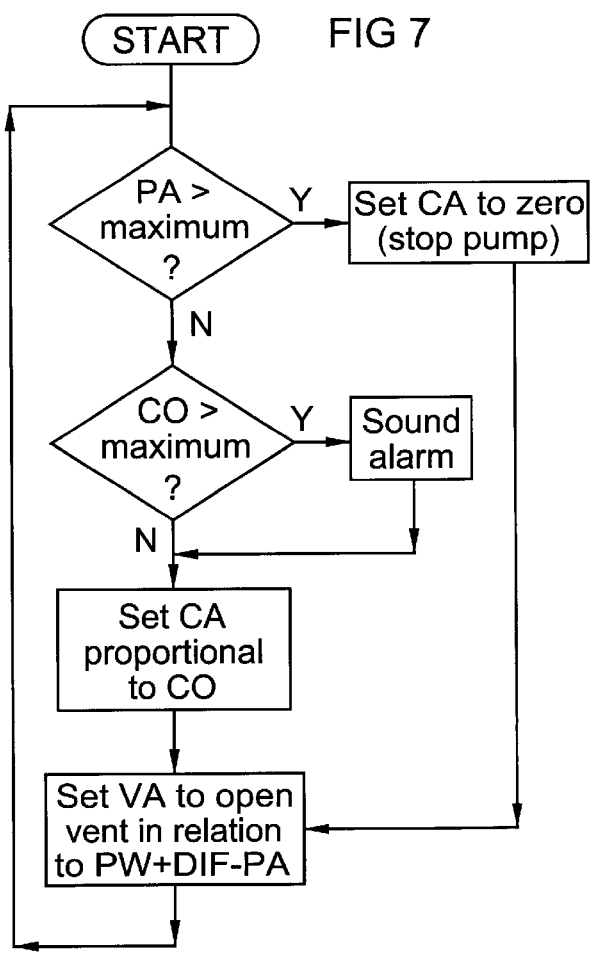
FIG. 7 is a flowchart of a control algorithm for the embodiment of FIGS. 4–5.

FIG. 7 is a control algorithm flow chart suitable for the device of FIGS. 4 and 5. DIF is the desired difference in pressure between the liquid and the scrubbing gas. The gas vent valve 23 is controlled to maintain the gas at slightly less pressure than the liquid in the tank.

Various forms of turbulence induction can be used. For example, the nozzle 3 can spray the liquid across the scrubbing gas layer from one side of the tank to the other without baffles. Alternately, the nozzle can spray upward from the just above the surface of the liquid toward the top of the tank for a round trip of spray up and down through the gas. In any of the embodiments the liquid nozzle and baffles can be below the waterline as in FIG. 4. If desired, the gas inlet can be below the waterline, creating turbulence by bubble upwelling. However, the preferred embodiments are shown. The overall preferred embodiment for household water scrubbing is FIG. 2.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A process for removing dissolved gasses from a liquid, comprising the steps of:

providing a hollow tank with a liquid inlet, a liquid outlet, a gas inlet, a gas outlet, and a desired liquid level in the tank;

connecting a source of liquid to the liquid inlet, the liquid having a given pressure;

providing a constant flow of gas to the gas inlet, the gas having a pressure higher than said given pressure;

providing a variable gas flow valve on the gas outlet that continuously releases gas from the tank in inverse proportion to the liquid level in the tank; and, stabilizing the liquid level in the tank around the desired liquid level by variably venting gas from the tank via the gas flow valve in inverse proportion to the liquid level in the tank, without controlling a liquid pump;

whereby the process continuously removes dissolved gasses from a liquid without the need to control a liquid pump, whether the liquid is drawn continuously or intermittently for use from the tank.

2. A machine for removing dissolved gasses from liquids, comprising:

a tank with a liquid inlet, a desired liquid level in the tank, a gas inlet, and a gas outlet;

a spray nozzle on the liquid inlet for injecting a liquid turbulently into the tank;

a continuous gas pump connected to the gas inlet for continuously pumping a scrubbing gas into and through the tank;

at least one gas outlet on the tank for venting the scrubbing gas from the tank; and, continuous stabilization means for maintaining the desired liquid level in the tank without controlling a liquid pump;

whereby the machine can be attached to plumbing without electrical connections to a liquid pump, and provides continuous effective removal of dissolved gasses from a liquid supply, whether the liquid is drawn continuously or intermittently.

3. The machine of claim 2, wherein the gas outlet is at the desired level of liquid in the tank, and further comprising:

a float valve on the gas outlet that continuously releases the scrubbing gas from the tank in inverse proportion to the liquid level in the tank, unless the liquid level in the tank rises above the desired liquid level;

a demand valve on the liquid inlet;

no demand valve on the liquid outlet; and, wherein the liquid outlet comprises a fluid communication channel with an inlet end inside the tank below the desired liquid level, and an outlet end outside the tank above the desired liquid level;

whereby the machine can be attached to household plumbing without electrical connections to a water pump, and provides continuous effective removal of dissolved gasses from a household water supply, whether the water is drawn continuously or intermittently.

4. The machine of claim 2, wherein the gas outlet is at the desired level of liquid in the tank, and further comprising:

a float valve on the gas outlet that continuously releases the scrubbing gas from the tank in inverse proportion to the liquid level in the tank when the liquid level in the tank is at or below the desired liquid level;

a second gas outlet in the tank above the desired liquid level that continuously releases the scrubbing gas from the tank in proportion to the pressure of the scrubbing gas in the tank when the liquid level in the tank is above the desired liquid level;

at least one demand valve on the liquid outlet; and, no demand valve on the liquid inlet;

whereby the machine can be attached to household plumbing without electrical connections to a water pump, and provides continuous effective removal of dissolved gasses from a household water supply, whether the water is drawn continuously or intermittently.

5. The machine of claim 2, further comprising:

at least one demand valve on the liquid outlet;

an electronic logic circuit having electronic inputs and outputs;

a liquid inlet pressure sensor on the liquid inlet providing a first input to the logic circuit;

a scrubbing gas inlet pressure sensor on the gas inlet providing a second input to the logic circuit;

a liquid level sensor on the tank at the desired liquid level providing a third input to the logic circuit; and a gas vent rate control valve on the scrubbing gas outlet controlled by a first output from the logic circuit to continuously vent the scrubbing gas from the tank at a rate calculated to maintain the desired liquid level in the tank;

whereby the machine can be attached to household plumbing without electrical connections to a water pump, and provides continuous effective removal of dissolved gasses from a household water supply, whether the water is drawn continuously or intermittently.

6. The machine of claim 5, further comprising:

a contamination level sensor on the liquid outlet providing a fourth input to the logic circuit;

a gas pump rate control output connected from the logic circuit to the gas pump; and, wherein the logic circuit varies the rate of the gas pump in proportion to the contamination level sensed at the liquid outlet.

7. The machine of claim 2, further comprising:

at least one demand valve on the liquid outlet;

a semi-permeable membrane horizontally sealed across the interior of the tank at the desired liquid level;

the liquid inlet below the level of the membrane;

an electronic logic circuit having electronic inputs and outputs;

a headspace gas pressure sensor on the tank providing a first input to the logic circuit;

a liquid pressure sensor on the tank below the membrane providing a second input to the logic circuit;

a gas vent rate control valve on the scrubbing gas outlet controlled by a first output from the logic circuit to continuously vent the scrubbing gas from the tank at a rate calculated to maintain a headspace gas pressure slightly below the pressure of the liquid in the tank;

whereby the machine can be attached to household plumbing without electrical connections to a water pump, and provides continuous effective removal of dissolved gasses from a household water supply, whether the water is drawn continuously or intermittently.

8. The machine of claim 7, wherein the gas pump has an electronically controllable pumping rate, and further comprising:

a contamination level sensor on the liquid outlet providing a third input to the logic circuit;

a gas pump rate control output connected from the logic circuit to the gas pump; and, wherein the logic circuit varies the rate of the gas pump in proportion to the contamination level sensed at the liquid outlet.

* * * * *